US012566130B2

(12) United States Patent (10) Patent No.: US 12,566,130 B2
Nishijima et al. (45) Date of Patent: Mar. 3, 2026

(54) INFRARED LIGHT ABSORBENT BODY, AND GAS SENSOR PROVIDED WITH INFRARED LIGHT ABSORBENT BODY

(71) Applicants: National University Corporation YOKOHAMA National University, Yokohama (JP); FIGARO ENGINEERING INC., Mino (JP)

(72) Inventors: Yoshiaki Nishijima, Yokohama (JP); Hiromasa Takashima, Osaka (JP); Tsuyoshi Ueda, Osaka (JP); Tomohiro Kawaguchi, Mino (JP); Soichiro Sakai, Mino (JP)

(73) Assignees: NATIONAL UNIVERSITY CORPORATION YOKOHAMA NATIONAL UNIVERSITY, Kanagawa (JP); NEW COSMOS ELECTRIC CO., LTD., Osaka (JP); FIGARO ENGINEERING INC., Osaka (JP)

( * ) Notice: Subject to any disclaimer, the term of this patent is extended or adjusted under 35 U.S.C. 154(b) by 512 days.

(21) Appl. No.: 18/269,322

(22) PCT Filed: Dec. 15, 2021

(86) PCT No.: PCT/JP2021/046286
§ 371 (c)(1),
(2) Date: Jun. 23, 2023

(87) PCT Pub. No.: WO2022/138377
PCT Pub. Date: Jun. 30, 2022

(65) Prior Publication Data
US 2024/0053261 A1 Feb. 15, 2024

(30) Foreign Application Priority Data

Dec. 25, 2020 (JP) ................................ 2020-216968

(51) Int. Cl.
*G01N 21/3504* (2014.01)
*G01N 21/552* (2014.01)

(52) U.S. Cl.
CPC ....... *G01N 21/3504* (2013.01); *G01N 21/554* (2013.01)

(58) Field of Classification Search
CPC ............. G01N 21/3504; G01N 21/554; G01N 21/0303; G01J 2003/1213; G01J 3/42; G06V 10/14; G06T 2207/10048
See application file for complete search history.

(56) References Cited

U.S. PATENT DOCUMENTS 6,194,722 B1 2/2001 Fiorini et al.
2009/0268205 A1 10/2009 Naya
(Continued)

FOREIGN PATENT DOCUMENTS

CN 107561028 A 1/2018
JP 09-061242 A 3/1997
(Continued)

OTHER PUBLICATIONS

Espacenet English Translation of WO2019131640A1 (Year: 2019).*
Official Communication issued in International Patent Application No. PCT/JP2021/046286, mailed on Feb. 1, 2022.

*Primary Examiner* — Kathryn Elizabeth Limbaugh
(74) *Attorney, Agent, or Firm* — Keating & Bennett, LLP

(57) ABSTRACT

The infrared absorber 1 is provided with a finely structured metal layer 2 which causes local surface plasmon resonance by absorption infrared light; a dielectric layer 3 under the finely structured metal layer, and a metal layer 4 under the dielectric layer 3. The dielectric layer 3 is stacked between the layers 2 and 4 and consists of an organic polymer material having a molecular bond whose vibration is excited by infrared absorption. Further, the gas sensor is provided
(Continued)

with the infrared absorber as the light source and/or the photodetector.

8 Claims, 4 Drawing Sheets

(56)                References Cited

U.S. PATENT DOCUMENTS

2020/0072676  A1      3/2020   Yamazaki et al.
2021/0294009  A1      9/2021   Misawa et al.

FOREIGN PATENT DOCUMENTS

JP            2020-134337  A        8/2020
JP         WO2019131640  A1  *   1/2021    ........... C25B  11/049

* cited by examiner

F I G. 1
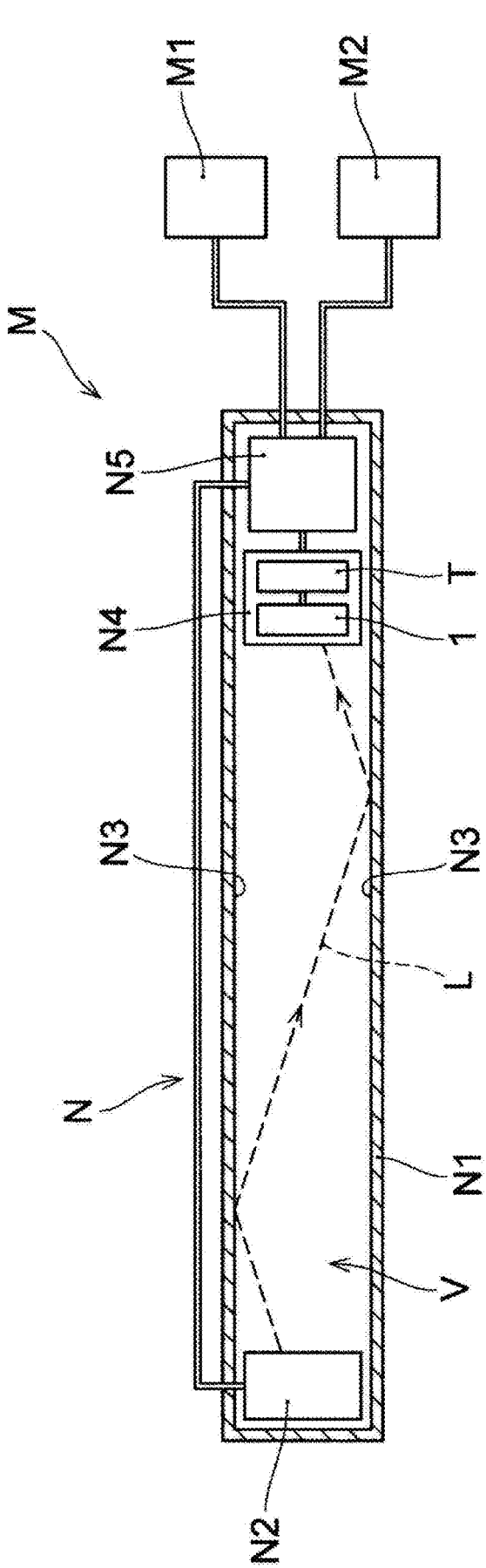

F I G. 5
(a)
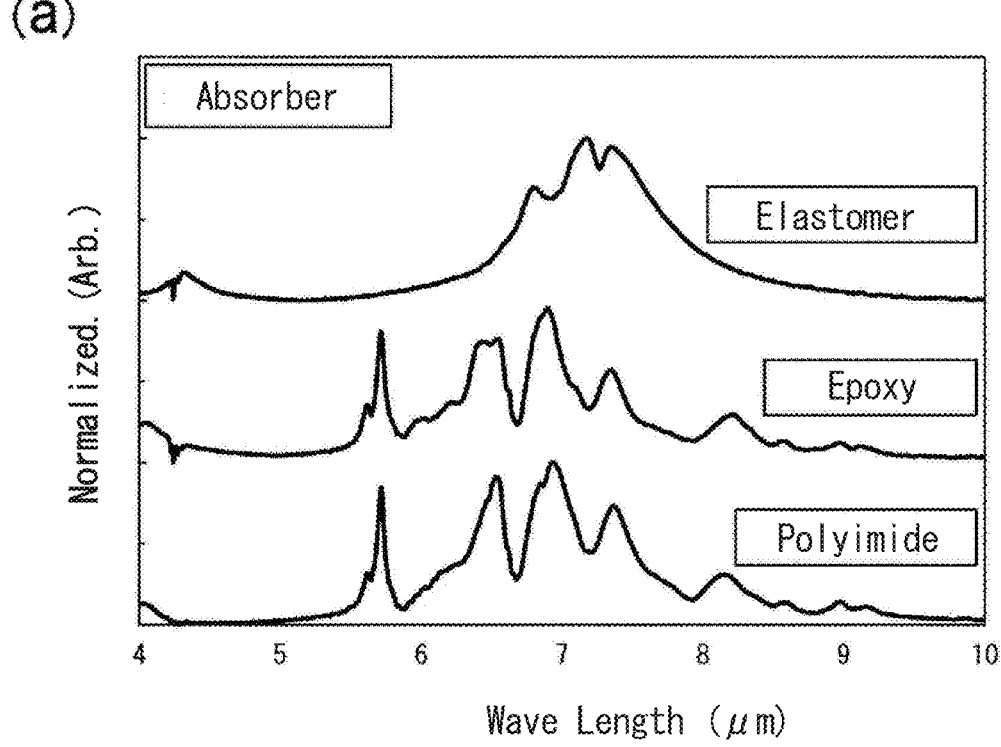
(b)
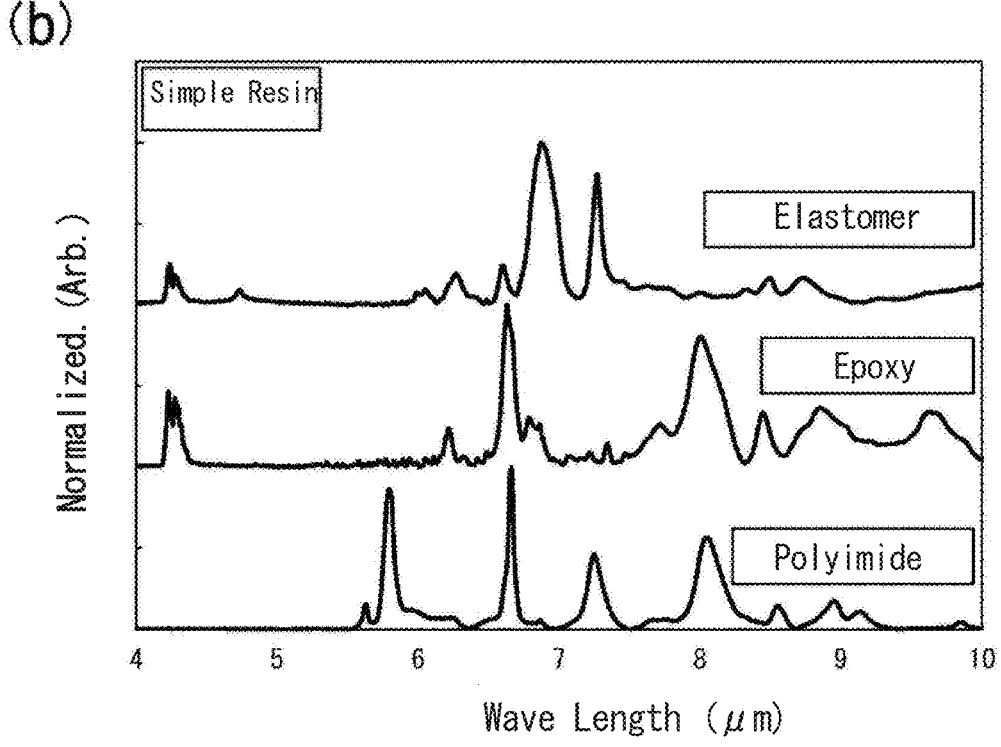

INFRARED LIGHT ABSORBENT BODY, AND GAS SENSOR PROVIDED WITH INFRARED LIGHT ABSORBENT BODY

FIELD OF THE INVENTION

The present invention relates to an infrared absorber and a gas sensor provided with the infrared absorber.

BACKGROUND ART

Conventional gas sensors, such as non-dispersive infrared sensors (NDIR), utilize infrared light absorption for the detection of gases. These gas sensors utilize infrared light to identify and quantify gases based upon infrared absorption by the vibrational excitation of the molecules in the gases. For example, NDIR gas sensors illuminate gases with infrared lights from infrared light sources and measure absorption intensities of the infrared lights by the gases to detect them. The infrared light sources are, for example, tungsten filaments, and the infrared light detectors are, for example, pyroelectric sensors.

PRIOR DOCUMENT LIST

Patent Document

Patent Document 1: JP 2020/134,337A.

SUMMARY OF THE INVENTION

While tungsten filaments emit a wide-band infrared light to excite vibrations of various molecules, they are not suitable for exciting the vibrations of specific molecules. Further, while pyroelectric sensors detect infrared light of a wide range of wavelengths to detect infrared absorption by various molecules, they are not suitable for detecting infrared lights having a specific wavelength to be absorbed by specific molecules. Therefore, for the detection of specific gases accurately and highly sensitively, filters that pass infrared lights only of a specific wavelength are needed. However, gas sensors with such filters become large in size.

For keeping gas sensors small in size and detecting specific gases accurately and sensitively, infrared light sources comprising infrared light emitters having narrow-band infrared light emission characteristics are desired, or infrared light sensors comprising infrared absorbers having narrow-band infrared absorption characteristics are desired. An infrared absorber disclosed, for example, by the patent document 1 has narrow-band infrared light emission characteristics and narrow-band infrared absorption characteristics. The infrared absorber according to the patent document 1 uses local surface plasmon resonance and selectively absorbs the infrared light having the specific wavelength that satisfies the resonance condition and selectively emits the infrared light having the specific wavelength that satisfies the resonance condition. For example, the infrared lights generated by local surface plasmon resonance have a similar width in wavelength to those of LEDs and are enough narrower in wavelength than those by tungsten filaments. However, for detecting gases to be detected more accurately and more sensitively, narrower infrared absorption and emission are needed.

The object of the invention is to provide an infrared absorber having narrow-band infrared absorbance and emission and a gas sensor with the infrared absorber.

The infrared absorber according to the invention is capable of absorbing and emitting infrared light and comprises:

a finely structured metal layer absorbing infrared light and generating local surface plasmon resonance;

a dielectric layer under the finely structured metal layer;

a metal layer under the dielectric layer, wherein the metal layer, the dielectric layer, and the finely structured metal layers are stacked, wherein the dielectric layer comprises an organic polymer material whose molecular vibration is excited by the absorption of infrared light.

The gas sensor according to the invention is provided with a light source and/or a photodetector consisting of the infrared absorber.

BRIEF DESCRIPTION OF THE DRAWINGS

FIG. 1 is a schematic view of a gas detector including a gas sensor provided with an infrared absorber according to one embodiment of the invention.

FIG. 5 (a) is a characteristic diagram indicating the infrared absorption spectra of the infrared absorber with various dielectric layers comprising organic polymer materials and FIG. 5 (b) is a characteristic diagram indicating the infrared absorption spectra of the organic polymer materials.

FEATURES FOR CARRYING OUT THE INVENTION

An infrared absorber and a gas sensor provided with the absorber, both according to embodiments of the invention, will be described with reference to the drawings. The following embodiments are exemplary, and the infrared absorber and the gas sensor according to the invention are not restricted to the embodiments.

Figure 3:
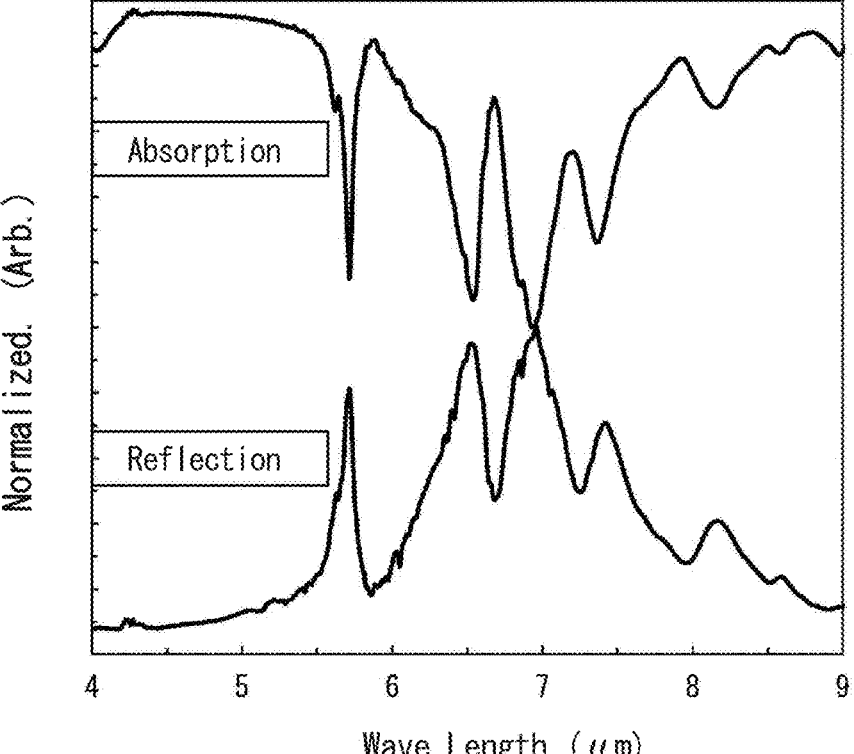
FIG. 3 is a characteristic diagram of the infrared absorption spectrum and the infrared light emission spectrum of the infrared absorber according to the embodiment of the invention.

The infrared absorber 1 according to the embodiment is capable of absorbing and emitting infrared light. FIG. 3 shows an exemplary infrared light reflection (absorption) spectrum and infrared light emission spectrum of the infrared absorber 1. In FIG. 3, the upper portion indicates the infrared light reflection (absorption) spectrum and the lower portion indicates the infrared light emission spectrum. In FIG. 3, the absorption ratio and the emission ratio are normalized and arranged parallelly for easy comparison. As is shown in FIG. 3, plural common peaks are present in both the infrared light reflection (absorption) spectrum and the infrared light emission spectrum. This indicates that the infrared absorber 1 is capable of both absorption and emission of infrared light. In addition, in FIG. 3, the plural peaks in the infrared light reflection (absorption) spectrum and the plural peaks in the infrared light emission spectrum are in common at the wavelengths and their shapes. This indicates the infrared absorption characteristic and the infrared light emission characteristic of the infrared absorber 1 correspond with each other. However, the infrared absorber 1 is enough if it can absorb and emit infrared light, and the peak wavelengths and the peak shapes may be different between the absorption and the emission.

The infrared absorber 1 may be used for infrared light detectors with usage of the infrared absorption characteristic and for infrared light emitters with usage of the infrared light emission characteristic. In the following, as is shown in FIG. 1, the infrared absorber 1 will be described as being used as a detector in a gas sensor N in a gas detector M. However, the infrared absorber 1 can be used as the light source of the gas sensor N or both the light source and the detector of the gas sensor N.

The gas detector M is used for detecting gases to be detected. The gases to be detected are, for example, carbon monoxide, carbon dioxide, methane, normal butane, isobutane, water vapor, ammonia, sulfur dioxide, sulfur trioxide, hydrogen sulfide, nitrous oxide, acetone, ozone, sulfur hexafluoride, octa-fluoro-cyclo-pentene, hexa-fluoro-1,3 butadiene and are gases absorbing infrared lights of specific wavelengths.

The gas detector M is provided with the gas sensor N for the detection of the gas to be detected, as shown in FIG. 1. The gas detector M is preferably provided with a manipulator M1, for example, manipulation buttons, and a display M2, for example, a liquid crystal display, for displaying the detection result by the gas sensor N. The gas detector M is provided with electricity from an inside battery or an outer power source to operate.

The gas sensor N irradiates light L to the gas to be detected and measures the absorption intensity (attenuation intensity) of the ray by the gas to detect the gas. The gas sensor N is, for example, a known non-dispersive infrared analyzer (NDIR). The gas sensor N is provided with a cell N1 having an inner space V; a light source N2 for emitting light L into the cell N1; a reflector N3 for reflecting the light L from the light source N2; a photodetector N4 for detecting the light L; and a peripheral circuitry N5 for controlling the light source N2 and the photodetector N4. In the gas sensor N, the light source N2; the reflector N3; the detector N4; and the circuitry N5 are integrated with the cell N1, and the gas sensor N forms a separate module. However, the gas sensor N may have a separate circuitry N5 from the cell N1 and is not limited to that disclosed in the figure.

The cell N1 accommodates the light source N2; the reflector N3; the photodetector N4; and the circuitry N5, and the gas is introduced into the inner space V. The cell N1 has, as shown in FIG. 1, a tubular shape extending along the left-right direction in FIG. 1 connecting the light source N2 and the photodetector N4, and has the inner space V within it. Further, the cell N1 is provided with a gas introduction portion not shown for introducing the gas and a gas emission portion for emitting the gas not shown. In the cell N1, the gas is introduced from the gas introduction portion and emitted from the gas emission portion. The cell N1 may be made of resin or the like. The cell N1 may be tubular as in the embodiment, roughly cubic, or in another shape.

The light source N2 emits the light L having a wavelength for the detection of gas. The light L includes a light component of the peak wavelength of the absorption by the gas to be detected and may be monochromatic or have a wide range of wavelengths. The light source N2 is connected to and controlled by the circuitry N5, as shown in FIG. 1. The light source N2 may be the infrared absorber 1, an LED, or an infrared light lamp. The light source N2 emits a continuous or a pulse light.

The reflector N3 reflects the light L from the light source in the cell N1 once or at plural times to guide light to the photodetector N4. The reflector N3 is provided on the inner surface of the cell N1. The reflector N3 may be a mirror or the infrared absorber 1. The infrared absorber 1 reflects the light L and makes the absorption of the light L by the gas enhanced by the local surface plasmon resonance.

The photodetector N4 detects and measures the light intensities of the light L. The photodetector N4 detects the light L after the propagation in the cell N1. The photodetector is aligned to effectively detect the light L. The photodetector N4 is provided with the infrared absorber 1 and a thermoelectric sensor T converting the heat from the infrared absorber 1 to an electric signal. The detector N4 absorbs the infrared light in the light L by the infrared absorber 1 converts it to heat and further converts it to the electric signal by the thermoelectric sensor T. The photodetector N4 is connected and outputs the signal to the circuitry N5. The thermoelectric sensor T may be Bi2Te3, PbTe, or the like thermoelectric conversion material. The infrared absorber 1 will be described in more detail. In place of the infrared absorber 1, a known pyroelectric sensor or the like may be adopted.

The circuitry N5 is connected to the light source N2 and the photodetector N4 and controls them. The circuitry N5 compares the light intensity from the light source N2 and the measured light intensity by the photodetector N4 to determine the absence/presence or the concentration of the gas to be detected. The circuitry N5 may be a known central processing unit (CPU).

Figure 2:
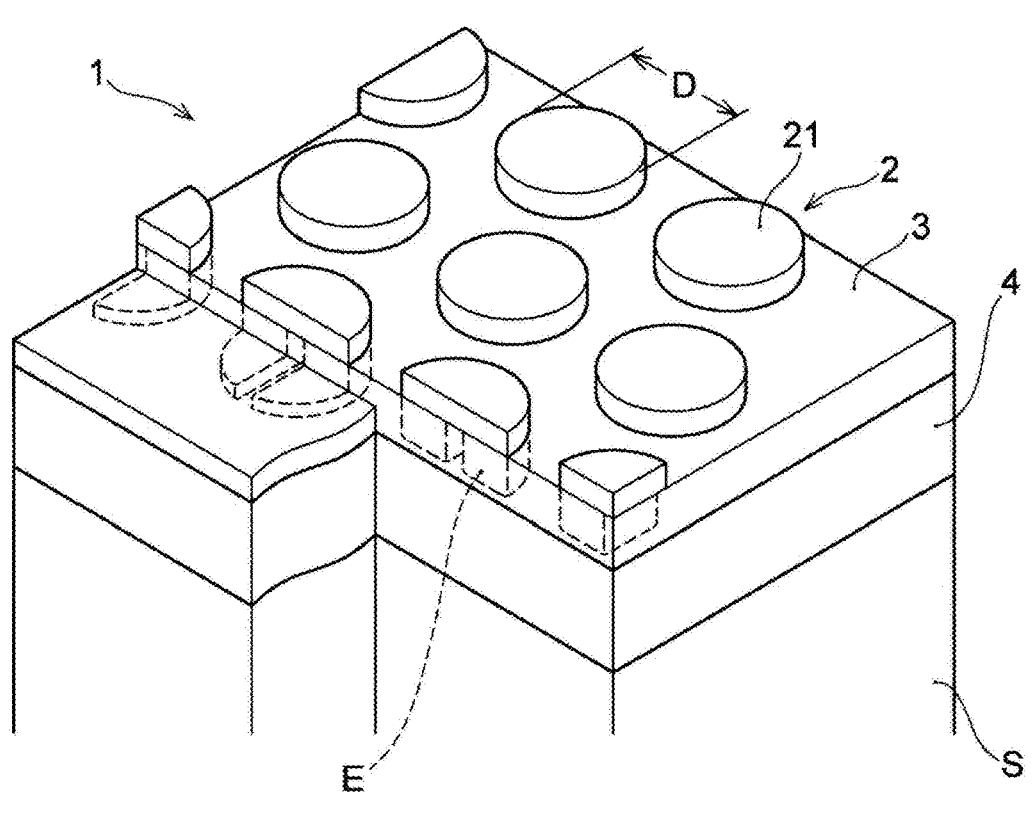
FIG. 2 is a schematic perspective view of the infrared absorber according to the embodiment of the invention with a cutout.

The infrared absorber 1 is shown in FIG. 2 and comprises a finely structured metal layer 2; a dielectric layer 3 under the finely structured metal layer 2; a further metal layer 4 under the dielectric layer 3 such that the dielectric layer 3 is stacked between the layers 2 and 4. When radiated by infrared light, the infrared absorber 1 causes local surface plasmon on its surface and enhances the infrared absorption. In particular, the infrared absorber 1 has a stack of layers 2, 3, and 4 such that the local surface plasmon resonance is enhanced. This is supposedly due to the following mechanism: a strong electric field is generated in the dielectric layer 3 between layers 2 and 4 at the portion schematically indicated by E in FIG. 2 when radiated by the infrared light and enhances the local surface plasmon resonance. In addition, a further intermediate layer or layers may be provided for improving the adhesion strength between the layers 2 to 4.

The infrared absorber 2 is provided on and supported by a substrate S as shown in FIG. 2. The substrate S may be a semiconductor, a dielectric material, or a metal, as long as it can support the infrared absorber 1. For example, the substrate S may be a silicon, sapphire, or glass substrate. An intermediate layer may be provided between the substrate S and the infrared absorber 1. In addition, the infrared absorber 1 may have a membrane-like structure supported by its sides.

The finely structured metal layer 2 absorbs infrared light at a wavelength which satisfies the resonance condition and generates local surface plasmon resonance. When the finely structured metal layer 2 is irradiated by infrared light, a plasmonic vibration of free electrons is caused at the surface of the finely structured metal layer 2. This generates a coarse and dense distribution of the free electrons and thereby the polarization of the finely structured metal layer 2. When the wavelength of the infrared light and the permittivity of the surface of the finely structured metal layer 2 satisfy the resonance conditions, the local surface plasmon resonance is induced in and on the finely structured metal layer 2 due to the strong polarization. When the local surface plasmon resonance is induced on and in the finely structured metal layer 2, the finely structured metal layer 2 becomes having a larger infrared absorbance at the resonance wavelength. The finely structured metal layer 2 may be produced by any known semiconductor production methods, such as photo-lithography, without any restrictions.

The finely structured metal layer 2 may have an arbitrary structure as long as it causes the local surface plasmon resonance. The finely structured metal layer 2 may have a nano-disc array structure having plural island-like metal structures consisting of a periodical pattern and being dis-persively arranged on the two-dimensional surface or a nano-hole array structure where plural holes are arranged in a metal layer. In the embodiment, the finely structured metal layer 2 has roughly circular finely structured metal bodies 21 which are arranged on the dielectric layer 3 with a mutual gap.

The finely structured metal layer 2 has a shape and a size suitable for causing the local surface plasmon resonance on and in the finely structured metal bodies 21 when irradiated by infrared light. The induced local surface plasmon reso-nance has a resonant wavelength dependent upon the shape of the finely structured metal layer 2. Rod-like and plate-like shapes of the finely structured metal bodies 21 make the resonant wavelength longer. Therefore, the finely structured metal bodies 21 have shapes, such as roughly circular, roughly cubic, roughly semi-circular, or roughly rod-like ones, dependent upon the resonant wavelength. The local surface plasmon resonance has an infrared light wavelength dependent upon the size of the finely structured metal bodies 21. The larger size of the finely structured metal bodies 21, such as the larger diameter D of the finely structured metal bodies 21, the local surface plasmon resonance has a longer resonant wavelength. Therefore, the sizes of the finely structured metal bodies 21 are determined according to the desired wavelength.

Figure 4:
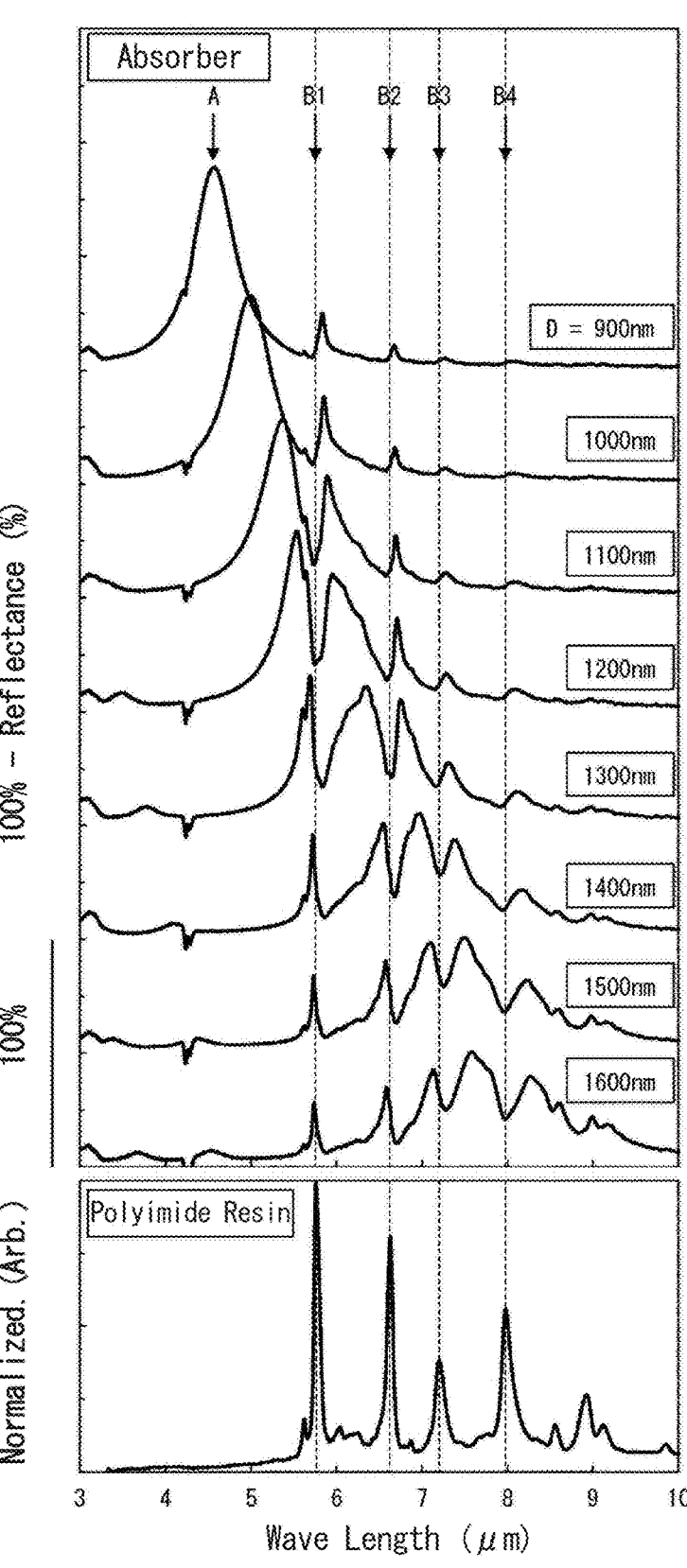
FIG. 4 is a characteristic diagram indicating the changes of the infrared absorber in the infrared absorption spectrum when the infrared absorber according to the embodiment of the invention is modified in diameter.

FIG. 4 indicates the changes in the infrared light reflection (absorption) spectra when the diameter D is changed. In FIG. 4, the vertical axis indicates values which are equal to 100% minus the reflectivity, and the higher values indicate the higher absorbance. As shown in FIG. 4, an infrared absorber 1 having a diameter D of 900 nm of the finely structured metal bodies 21 causes a large absorption peak A due to the local surface plasmon resonance at 4.5 microm-eter. The larger diameters of 1000 nm and 1100 nm cause the absorption peak A to have a longer peak wavelength. Thus, the absorption wavelength of the infrared light due to the local surface plasmon resonance can be tuned by adopting a suitable diameter D.

For improving the infrared absorbance, the finely struc-tured metal bodies 21 have a diameter, for example, not less than 1000 nm and not more than 5000 nm, preferably one not less than 1000 nm and not more than 2000 nm, more preferably one not less than 1000 nm and not more than 1800 nm, and most preferably one not less than 1000 nm and not more than 1600 nm.

As has been described, adequate setting of the finely structured metal layer 2 allows the absorption wavelength by the local surface plasmon resonance. As will be described below, when the absorption peak wavelength due to the molecular vibration in the dielectric layer 3 is made near the absorption peak wavelength due to the local surface plasmon resonance, the absorption peak due to the molecular vibra-tion changes largely in the absorption intensity and absorp-tion wavelength. This is supposedly by the strong coupling between the local surface plasmon resonance and the molecular vibration. Therefore, for enhancing the absorption intensity of the vibrational mode, the absorption peak wave-lengths of the local surface plasmon resonance and molecu-lar vibration in the dielectric layer 3 are preferably made near.

While the finely structured metal layer 2 can have an arbitrary thickness as long as the local surface plasmon resonance occurs, it has a thickness, for example, between 10 to 200 nm, preferably 30 to 100 nm, more preferably 35 nm to 75 nm, and most preferably 40 nm to 70 nm.

While the finely structured metal layer 2 can comprise an arbitrary metal as long as the local surface plasmon reso-nance occurs, it comprises, for example, one or more metals selected from the group consisting of gold (Au), silver (Ag), copper (Cu), platinum (Pt), and palladium (Pd). The finely structured metal layer 2 comprises preferably Au or Ag for their chemical stability and high infrared absorption due to the local surface plasmon resonance. Gold (Au) is preferable for its surface chemical stability, and silver (Ag) is prefer-able for its high infrared absorbance.

The metal layer 4 enhances the local surface plasmon resonance caused in and on the finely structured metal layer 2 when the dielectric layer 3 and the finely structured metal layer 2 are stacked on the metal layer 4. The metal layer 4 includes a metal component and is electrically conductive. According to the embodiment, the metal layer 4 is formed on the substrate S, and the dielectric layer 3 is stacked on the metal layer 4. The metal layer 4 is a continuous layer on the substrate S and is made by resistive heating vapor deposi-tion, sputtering, electron bean vapor deposition, or the like.

The metal layer 4 has an arbitrary thickness as long as it enhances the local surface plasmon resonance. The metal layer reflects infrared light and reduces the transmission of infrared light and has an infrared light reflectance over its infrared transmittance. The metal layer 4 has preferably a thickness not less than 100 nm and more preferably not less than 150 nm, and most preferably not less than 200 nm for reducing the infrared light transmission. For making the metal layer 4 uniform, it has preferably a thickness not more than 1000 nm, more preferably not more than 600 nm, and most preferably not more than 400 nm.

The metal layer 4 comprises an arbitrary metal or metals as long as it enhances the local surface plasmon resonance and has preferably a high reflectance to infrared light. It comprises one or more metals selected from the group of gold (Au), silver (Ag), copper (Cu), platinum (Pt), alumi-num (Al), osmium (Os), rhodium (Rh), and ruthenium (Ru). The metal layer 4 may be tin-indium oxide (ITO) or the like. The metal layer 4 is made of gold or silver and most preferably gold for the surface chemical stability.

As shown in FIG. 2, the dielectric layer 3 is stacked between the finely structured metal layer 2 and the metal layer 4 and localizes the electric field due to the local surface plasmon resonance within it. The dielectric layer 3 is a continuous layer on the metal layer 4. The dielectric layer 3 is made by spin-coat, vacuum vapor deposition, or the like.

The dielectric layer 3 comprises an organic polymer material having an infrared active molecular vibrational mode and absorbs infrared light with the excitation of the vibrational mode. As shown in FIG. 4, the narrow absorption peaks B1 to B4 appear such that their absorption intensity and wavelength change according to the diameter of the finely structured metal bodies 21. These peaks are due to excitation of molecular vibration in the organic polymer material (in the embodiment, polyimide resin). For reference purposes, in the lower portion of FIG. 4, the infrared absorption spectrum of simple polyimide resin. As is indi-cated in FIG. 4, the peak width due to the molecular vibrational excitation in the organic polymer material (in particular, C=O vibrational absorption peak B1) is narrower than that of the absorption peak A due to the local surface plasmon resonance. Therefore, the absorption peaks due to the molecular vibration, in particular, the peak B1, make narrow-band infrared absorption characteristics and narrow-band infrared light emission.

As shown in FIG. 4, the combination of absorption due to the molecular vibrational mode and local surface plasmon resonance makes the infrared absorption greater. Therefore, the dielectric layer 3 comprising the organic polymer material between the layers 2 and 4 generates the narrow and intense infrared absorption peaks. Here, when the discrepancy between the absorption peak wavelength is made smaller, the infrared absorption due to the molecular vibration is enhanced. This indicates the strong interaction between the molecular vibration in the dielectric layer 3 and the local surface plasmon resonance in the finely structured metal layer 2. Therefore, the above discrepancy should be small. For example, the discrepancy between the peak wavelengths is preferably smaller than 3 micrometer, more preferably smaller than 2 micrometer, and most preferably smaller than 1 micrometer.

The organic polymer material in the dielectric layer 3 is not particularly limited as long as it has an infrared active molecular vibrational mode. Preferably, it is a heat-resistant organic polymer material for infrared light emission. The heat resistance means that the polymer does not undergo substantial changes when heated. The supposed heated temperature is at least 100 to 200 degree Celsius, preferably 200 to 300 degree Celsius, more preferably 300 to 400 degree Celsius, and 400 to 500 degree Celsius. The organic polymer material maintains preferably the infrared absorbance due to vibrational excitation at least 60%, preferably 70% or more, more preferably 80% or more, and most preferably 90% or more in comparison with those before heating.

The heat-resistant organic polymer material has a molecular vibrational mode which is active to infrared light and includes preferably one or more selected from the group of polyimide resin, epoxy resin, thermosetting elastomer resin, melamine resin, fluoro-resin, and urea resin. The heat-resistant organic polymer material includes preferably one or more selected from the group of polyimide resin, epoxy resin, and thermosetting elastomer resin for enhancing the local surface plasmon resonance and molecular vibrational excitation.

The thickness of the dielectric layer 3 is, for example, at least 50 nm, preferably at least 100 nm, and more preferably at least 200 nm for enhancing the infrared absorbance. The thickness of the dielectric layer 3 is, for example, at most 600 nm, preferably at most 500 nm, and more preferably at most 400 nm for enhancing the molecular vibrational excitation in the dielectric layer 3.

While one embodiment of the invention has been described, the present invention is not limited to the embodiment. The above embodiment has the following features.

(1) The infrared absorber is capable of absorbing and emitting infrared light and comprises:
    a finely structured metal layer absorbing infrared light and generating local surface plasmon resonance;
    a dielectric layer under the finely structured metal layer;
    a metal layer under the dielectric layer,
    wherein the metal layer, the dielectric layer, and the finely structured metal layers are stacked, wherein the dielectric layer comprises an organic polymer material whose molecular vibration is excited by absorption of infrared light.

The above feature (1) makes the narrow-band infrared absorption and emission.

(2) The organic polymer material consists of one or more selected from a group of polyimide resin, epoxy resin, thermosetting elastomer resin; melamine resin, fluoro-resin, and urea resin.

The above feature (2) increases the heat-resistant property of the dielectric layer and infrared light emission when heated.

(3) The dielectric layer has a thickness not less than 200 nm and not more than 400 nm.

The above feature (3) increases the infrared absorption by the excitation of molecular vibrational mode and enhances the local surface plasmon resonance.

(4) The finely structured metal layer consists of a plurality of roughly circular disc-like finely structured metal bodies and the roughly circular disc-like finely structured metal bodies have a diameter not less than 1000 nm and not more than 2000 nm.

The above feature (4) increases the infrared absorption by the excitation of molecular vibrational mode in the dielectric layer.

(5) The gas sensor is provided with a light source and/or a photodetector consisting of the infrared absorber.

The above feature (5) allows highly accurate and sensitive detection of gases to be detected.

EMBODIMENT

The infrared absorber according to the embodiment will be described in more detail but the invention is not limited to the embodiment.

Infrared Absorber

The infrared absorber 1 shown in FIG. 1 was prepared. The preparation conditions were as follows:
    The finely structured metal layer 2 was made of Au (material), and the finely structured metal bodies 21 had diameters from 900 nm to 1600 nm and a thickness of 50 nm and were produced by electron beam lithography and vapor deposition by resistive heating.
    The dielectric layers 3 were made of polyimide resin (vacuum polymerization or commercial "Pyre-M.L." resin of IST corporation); epoxy resin (commercial "SU-8" of Nippon Kayaku); and thermosetting elastomer resin ("OMR-100" of Tokyo Oka Kogyou Ltd.). They had a thickness of 300 nm and were made by spin-coat or vacuum deposition.
    The metal layer 4 was made of Au, had a thickness of 200 nm, and was prepared by resistive heating deposition.

Measurement of the Reflection (Absorption) and Emission Spectra

The infrared light reflection (absorption) spectrum was measured by irradiating the absorber 1 vertically to the absorber 1 by infrared light and measuring the reflected infrared light roughly vertically to the absorber 1. The infrared light emission spectrum was measured by heating the absorber at 150 degree Celsius and measuring emitted infrared light in a direction roughly perpendicular to the absorber 1.

Relation Between the Infrared Absorbance and Emission

FIG. 3 indicates the infrared light reflection (absorption) and infrared light emission spectra of an absorber 1 with a finely structured metal bodies of a diameter D of 1400 nm and a dielectric layer 3 of polyimide resin. In the figure, the absorption and transmission are normalized for easy comparison. FIG. 3 shows plural reflection (absorption) peaks (on the upper side) and emission peaks (on the lower side). These facts indicate that the absorber 1 can absorb and emit infrared light. Further, the peak wavelengths and shapes are similar between the reflection (absorption) and emission, and this indicates the absorption characteristics and the emission characteristics correspond to each other.

Relation Between the Diameter of the Finely Structured Metal Bodies and Infrared Absorbance FIG. 4 indicates the infrared absorption spectrum of an absorber 1 with polyimide dielectric layer 3 and the finely structured metal bodies having diameters D from 900 nm to 1600 nm. FIG. 4 indicates values of 100% minus the reflectivity. The lower portion of FIG. 4 indicates the infrared absorption spectrum of simple polyimide resin. A finely structured metal bodies 21 having a diameter of 900 nm have a strong peak at 4.5 micrometer. This peak A is due to the local surface plasmon resonance in and on the finely structured metal layer 2. The peak A shifts to the longer wavelength as the diameter of the bodies 21 becomes larger. Namely, the resonance wavelength of the peak A can be adjusted by controlling the diameter of the bodies 21.

In FIG. 4, the absorption peaks B1 to B4 (vibrational peaks hereunder) are due to the vibrational excitation of molecular bonds in the polyimide resin of the dielectric layer 3. For example, the vibrational peak B1 corresponds to the excitation of C=O bond in the polyimide resin. The widths of the vibrational peaks B1 to B4 are narrower than that of the resonance peak A. Therefore, narrow-band infrared absorption and emission can be realized.

The vibrational peak B1 indicates that the larger the diameter of the bodies 21 is, the resonance peak A shifts to a longer wavelength. In addition, the intensity of the vibrational peak B1 increases when the resonance peak A shifts from a relatively short wavelength to one near the vibrational peak B1, and decreases when the wavelength of resonance peak A shifts from one near the vibrational peak B1 to the longer side. These facts indicate when the vibrational peaks and the local surface plasmon resonance peaks come near in their wavelengths, the coupling between them is enhanced. According to the embodiment of the absorber 1, using the vibrational peaks enhanced by local surface plasmon resonance allows narrow-band and high-efficiency infrared absorption and emission realized. The discrepancy between the resonance peak and the vibrational peak is preferably not more than 3 micrometer and more preferably not more than 2 micrometer, and most preferably not more than 1 micrometer.

Infrared Absorbance Regarding Other Dielectric Materials

FIG. 5 (*a*) indicates infrared absorption spectra of the absorber 1 having bodies 21 of diameter D of 1400 nm and dielectric layers 3 consisting of polyimide resin, epoxy resin, and thermosetting elastomer resin. The absorption spectra of the simple resins are indicated in FIG. 5 (*b*). The absorption spectra in FIG. 5 (*a*) are substantially different from those of the simple resins in the peak positions and shapes. Namely, not only the polyimide resin but also the epoxy resin and thermosetting elastomer resin show the coupling between the local surface plasmon resonance and the molecular vibration. Thus, the dielectric layer 3 of other organic polymers such as epoxy and thermosetting elastomer can realize narrow-band high-efficiency infrared absorption and emission.

LIST OF SYMBOLS

1 infrared absorber
2 finely structured metal layer
21 finely structured metal body
3 dielectric layer
4 metal layer
A absorption (resonance) peak
B1-B4 absorption (vibration) peak
D diameter of the finely structured metal body
E electric field
L light
M gas detector
M1 manipulator
M2 display
N gas sensor
N1 cell
N2 light source
N3 reflector
N4 photodetector
N5 peripheral circuitry
S substrate
T thermoelectric sensor
V inner volume

What is claimed is:

1. A gas sensor comprising:
a cell allowing ambient atmosphere in and out;
an infrared light source provided in the cell;
a photodetector provided in the cell; and
a plasmon device integrally provided with the infrared light source or the photodetector;
wherein the plasmon device comprises:
a continuous metal layer;
an organic polymer resin layer having an infrared absorption and emission activity, and provided on the continuous metal layer; and
an array of finely structured metal bodies with a mutual gap, provided on the organic polymer resin layer, and causing local surface plasmon resonance with infrared light, and
has an infrared absorption and emission peak generated by a combination of the local surface plasmon resonance and the infrared absorption and emission activity of the organic polymer resin layer.

2. The gas sensor according to claim 1, wherein the plasmon device has the infrared absorption and emission peak at a wavelength overlapping an infrared absorption wavelength of a gas to be detected.

3. The gas sensor according to claim 1, wherein the organic polymer resin layer has a thickness not less than 200 nm and not more than 400 nm.

4. The gas sensor according to claim 3, wherein the array consists of a plurality of circular disc-like finely structured metal bodies, and
wherein a diameter of the circular disc-like finely structured metal bodies is determined such that a wavelength of the infrared absorption and emission peak of the plasmon device overlaps an infrared absorption wavelength of a gas to be detected.

5. The gas sensor according to claim 4, wherein the circular disc-like finely structured metal bodies have a diameter not less than 1000 nm and not more than 2000 nm.

6. The gas sensor according to claim 4, wherein the circular disc-like finely structured metal bodies have a thickness not less than 30 nm and not more than 100 nm.

7. The gas sensor according to claim 1, wherein the organic polymer resin layer consists of one member selected from a group consisting of polyimide resin, epoxy resin, thermosetting elastomer resin, melamine resin, fluoro-resin, and urea resin.

8. The gas sensor according to claim 6, wherein the organic polymer resin layer consists of one member selected from a group consisting of polyimide resin, epoxy resin, thermosetting elastomer resin, melamine resin, fluoro-resin, and urea resin.

\* \* \* \* \*